United States Patent
Orita et al.

(10) Patent No.: US 8,739,618 B2
(45) Date of Patent: Jun. 3, 2014

(54) APPARATUS AND METHOD FOR DETERMINING DEFORMATION SPEED OF ELASTIC MEMBER, AND ACTUATOR

(75) Inventors: Atsuo Orita, Wako (JP); Masao Kanazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 13/549,733

(22) Filed: Jul. 16, 2012

(65) Prior Publication Data

US 2013/0020980 A1  Jan. 24, 2013

(30) Foreign Application Priority Data

Jul. 20, 2011  (JP) .................................. 2011-159322

(51) Int. Cl.
*G01L 1/04* (2006.01)
(52) U.S. Cl.
USPC ........................................ 73/161; 73/862.391
(58) Field of Classification Search
USPC .......................................... 73/161, 849, 847
See application file for complete search history.

(56) References Cited

U.S. PATENT DOCUMENTS

| | | | |
|---|---|---|---|
| 7,553,283 B2 * | 6/2009 | Sandrin et al. ............... | 600/438 |
| 7,918,790 B2 * | 4/2011 | Ikeda et al. .................. | 600/152 |
| 8,156,825 B2 * | 4/2012 | Diaz et al. ................. | 73/862.621 |
| 8,239,089 B2 * | 8/2012 | Andres et al. ................ | 701/29.1 |
| 8,462,319 B2 * | 6/2013 | Andres et al. ................ | 356/4.06 |
| 2003/0192360 A1 * | 10/2003 | Narushima et al. ............. | 72/187 |
| 2006/0123897 A1 * | 6/2006 | Monguzzi et al. .............. | 73/146 |
| 2008/0075561 A1 | 3/2008 | Takemura et al. | |

FOREIGN PATENT DOCUMENTS

JP  2008-055541  3/2008

* cited by examiner

*Primary Examiner* — Max Noori
(74) *Attorney, Agent, or Firm* — Rankin, Hill & Clark LLP (57) ABSTRACT

A driving speed Vd that is a speed of a driving force input point at which a driving force from a driving element is transmitted to an elastic member is acquired. An approximate rate Ve of change of an amount of elastic deformation Pe is computed based upon a plurality of values of the amount of elastic deformation Pe acquired as a quantized value at different points in time, by smoothing out an abrupt change in the values of the amount of elastic deformation Pe caused to appear by quantization. A deformation speed V is computed based upon the driving speed Vd and the approximate Ve by: V=A·(−Vd)+B·Ve where A is a coefficient increasing with increase in frequency of fluctuations in a position of the driving force input point, and B is a coefficient increasing with decrease in the frequency of fluctuations in the position of the driving force input point.

11 Claims, 7 Drawing Sheets

APPARATUS AND METHOD FOR DETERMINING DEFORMATION SPEED OF ELASTIC MEMBER, AND ACTUATOR

CROSS-REFERENCE TO RELATED APPLICATION(S)

This application claims priority from Japanese Patent Application No. 2011-159332 filed on Jul. 20, 2011, the disclosure of which is incorporated herein by reference in its entirety.

BACKGROUND

The present invention relates to an apparatus and a method for determining a deformation speed of an elastic member through which a driving force is transmitted from a driving element to a member to be actuated, and also to an actuator in which such an apparatus or a method is implemented.

In recent years, a robot including an articulated structure with a joint has been proposed in which a rotary driving force from a driving element, such as a motor or a hydraulic actuator, is transmitted through an elastic member, such as a spring, to a link connected by the joint (see JP 2008-055541 A; a corresponding US Patent Application, assigned to the same entity as of the present application, has been published under US 2008/0075561 A1). This type of articulated structure is called Serial Elastic Actuator or SEA. When the link collides with an obstacle or the like, the elastic member deforms so that the obstacle or the driving element can be protected and the robot can be controlled appropriately based upon a load applied to the link which may be determined from the amount of deformation of the elastic member as detected, or otherwise.

To appropriately control the load applied at the joint is to appropriately control the amount of deformation of the elastic member. In addition to the amount of deformation, an accurate deformation speed (i.e., time rate of deformation) of the elastic member may be determined and used for that purpose. For example, when the deformation speed is changing, it would be beneficial to know whether the deformation speed is increasing or decreasing, and how great is the deformation speed of the elastic member, because the magnitude of the deformation speed would be a significant factor to be considered in determination of the strategy for control over the motion of the link, such as the optimum direction and amount thereof.

In order to determine the deformation speed of the elastic member, several methods may be adopted for determination which may be made by handling (or manipulating) data in either of an analog form or a digital form. One known method for determining the amount of deformation as analog data uses a strain gauge. This method using a strain gauge would allow errors (e.g., due to ambient temperature variation) or electrical noises to be introduced much into the determined data, and thus could not yield sufficiently precise results. In contrast, the method of detecting displacement (i.e. deformation amount) by using an optical sensor is currently available without such a problem; i.e., the deformation speed can be determined with a high degree of precision. This method may use an encoder to thereby obtain digital data (quantized values) as outputs.

As is often the case with the method for determining the amount of deformation of the elastic member, as quantized values, it would be difficult to accurately estimate the deformation speed. The deformation speed may be obtained by dividing a difference between two positions at the present point and the preceding point in time (i.e., the amount of deformation) by a sampling period. If the positions are represented as quantized values, the speed exhibits 0 at most of the points in time, and exhibits very great computed speeds only at a limited number of points in time on calculation.

In order to approximate the values, which are discrete in time, of the deformation speed to continuously changing values, a low pass filter may be applied to the deformation speed, or a curve fitting to the amounts of deformation may be determined and differentiated to obtain a smooth curve of the time-varying deformation speed less subject to fluctuations. However, the values of the deformation speed obtained by these methods would involve a delay or time lag between the obtained and true values, and thus would result in poor responsiveness particularly when the elastic member starts deforming. Although the responsiveness would possibly be improved by reducing the number of data consulted back to the past (and used for calculation) for approximation, the data obtained by this approximation would become excessively responsive to a negligible amount of change in the amount of deformation, and disadvantageously the stability would be impaired, instead.

The present invention has been created in an attempt to eliminate the above disadvantages.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY

It is one aspect of various embodiments of the present invention to provide an apparatus and a method for determining a deformation speed of an elastic member through which a driving force is transmitted from a driving element to a member to be actuated, with increased stability and responsiveness, and an actuator in which such an apparatus or a method is implemented.

More specifically, according to one or more embodiments, an apparatus for determining a deformation speed V that is a rate of change of an amount of elastic deformation of an elastic member that connects a driving element and a driven element to be actuated is provided, in which the deformation speed V is determined based upon quantized values of the amount of elastic deformation. This apparatus comprises a driving speed acquisition unit, a deformation amount acquisition unit, an approximate rate computation unit, and a deformation speed computation unit. The driving speed acquisition unit is configured to acquire a driving speed Vd that is a speed of a driving force input point at which a driving force from the driving element is transmitted to the elastic member. The deformation amount acquisition unit is configured to acquire an amount of elastic deformation Pe of the elastic member as a quantized value. The approximate rate computation unit is configured to compute an approximate rate Ve of change of the amount of elastic deformation Pe based upon a plurality of values of the amount of elastic deformation Pe acquired at different points in time by the deformation amount acquisition unit. The approximate rate Ve is a rate of change of the amount of elastic deformation Pe obtained by smoothing out an abrupt change in the values of the amount of elastic deformation Pe caused to appear by quantization. The deformation speed computation unit is configured to compute the deformation speed V of the elastic member based upon the driving speed Vd acquired by the driving speed acquisition unit and the approximate rate Ve computed by the approximate rate computation unit, by the following formula:

$$V=A\cdot(-Vd)+B\cdot Ve$$

where A is a coefficient increasing with increase in frequency of fluctuations in a position of the driving force input point, and B is a coefficient increasing with decrease in the frequency of fluctuations in the position of the driving force input point.

When a displacement is imparted to the driving force input point, the deformation (deformation produced by the imparted displacement) is transmitted through the elastic member from a first end thereof (a driving force input end) configured to receive the driving force from the driving element to a second end thereof (a driving force output end) connected to the driven element (i.e., load). The speed of transmission of this deformation varies with the modulus of elasticity of the elastic member; the greater the modulus of elasticity, the faster the deformation transmits, while the smaller the modulus of elasticity, the slower the deformation transmits. Although the speed varies depending upon the modulus of elasticity, any displacement imparted at very great speeds could not instantaneously be transmitted, so that the elastic member would deform only at its first end and the position of the second end would not change.

Accordingly, when displacements with extremely high frequency fluctuations are imparted to the driving force input end of the elastic member, the driving force output end of the elastic member is hardly subject to displacement, and thus the amount of deformation of the elastic member would be the same as that of the displacement imparted at the driving force input end. Therefore, computation of the deformation speed V of the elastic member by the formula $V=A\cdot(-Vd)+B\cdot Ve$ [A is a coefficient increasing with increase in frequency of fluctuations in a position of the driving force input point, and B is a coefficient increasing with decrease in the frequency of fluctuations in the position of the driving force input point] would provide adjusted values of the deformation speed V such that the driving speed (the speed of the driving force input point at which a driving force from the driving element is transmitted to the elastic member) Vd is weighted more according as the frequencies at which the position of the driving force input point fluctuates are higher, and the approximate rate Ve is weighted more according as the frequencies at which the position of the driving force input point fluctuates are lower. With this configuration, the delay which would otherwise result from computation of the approximate rate Ve can be reduced so that the deformation speed at the driving force input point can be computed without delay once the displacement occurs at the driving force input point, to thereby achieve an improved responsiveness. Furthermore, since the improved responsiveness is achieved by utilizing the weighted values of the driving speed Vd, it is not necessary to excessively reduce the number of data for use in computation of the approximate rate Ve. Since the approximate rate Ve is weighted for calculation of the deformation speed V if the rate of change of displacement of the driving force input point fluctuates at lower frequencies, the deformation speed of the elastic member can be obtained with high stability.

It is to be understood that the approximate rate Ve (of change of the amount of elastic deformation Pe) may be a rate of change acquired by any known method, e.g., using a low pass filter or a least square approximation, which may involve a delay in response. In the above-described apparatus, preferably but not necessarily, A+B=1. If the coefficients A and B, which are weights, satisfy the relationship A+B=1, then the deformation speed V can be determined appropriately. Depending upon the characteristics of a specific actuator in which the apparatus is incorporated for determining the deformation speed V, the coefficients A and B may be set to be particular appropriate values which may not satisfy A+B=1 for use in determination of the deformation speed V.

In the above-described apparatus, the coefficients A and B may be such that A=Ts/(Ts+1), and B=1/(Ts+1) where T is a time constant, and s is an independent variable.

According to one or more embodiments, a method for determining a deformation speed V that is a rate of change of an amount of elastic deformation of an elastic member that connects a driving element and a driven element to be actuated is provided, in which the deformation speed V is determined based upon quantized values of the amount of elastic deformation. The method comprises: acquiring a driving speed Vd that is a speed of a driving force input point at which a driving force from the driving element is transmitted to the elastic member; acquiring an amount of elastic deformation Pe of the elastic member as a quantized value; computing an approximate rate Ve based upon a plurality of values of the amount of elastic deformation Pe acquired at different points in time, the approximate rate Ve being a rate of change of the amount of elastic deformation Pe obtained by smoothing out an abrupt change in the values of the amount of elastic deformation Pe caused to appear by quantization; and computing the deformation speed V of the elastic member based upon the driving speed Vd and the approximate rate Ve, by the following formula:

$$V=A\cdot(-Vd)+B\cdot Ve$$

where A is a coefficient increasing with increase in frequency of fluctuations in a position of the driving force input point, and B is a coefficient increasing with decrease in the frequency of fluctuations in the position of the driving force input point.

Moreover, according to one or more embodiments, an actuator is provided which comprises a driving element, a driven element, an elastic member, a driving element speed sensor, a displacement sensor, and a deformation speed determination apparatus. The driven element is to be actuated by a driving force transmitted from the driving element. The elastic member is an elastically deformable member having a first end configured to receive the driving force from the driving element and a second end connected to the driven element, to transmit a motion of the driving element to the driven element. The driving element speed sensor is configured to detect a speed of the driving element. The displacement sensor is configured to detect an amount of elastic deformation Pe of the elastic member to output quantized values of the amount of elastic deformation Pe of the elastic member. The deformation speed determination apparatus is configured to determine a deformation speed V that is a rate of change of an amount of elastic deformation of the elastic member, based upon the speed of the driving element detected by the driving element speed sensor and the quantized values of the amount of elastic deformation Pe detected by the displacement sensor. The deformation speed determination apparatus includes a driving speed acquisition unit, a deformation amount acquisition unit, an approximate rate computation unit, and a deformation speed computation unit. The driving speed acquisition unit is configured to acquire a driving speed Vd that is a speed of a driving force input point at which the driving force from the driving element is transmitted to the elastic member, based upon the speed of the driving element detected by the driving element speed sensor. The deformation amount acquisition unit is configured to acquire the quantized values of the amount of elastic deformation Pe detected from the displacement sensor. The approximate rate computation unit is configured to compute an approximate rate Ve of change of the amount of elastic deformation Pe based upon the quantized values of the amount of elastic deformation Pe acquired at different points in time by the deformation amount acquisition unit. The approximate rate Ve is a rate of change of the amount of elastic deformation Pe obtained by smoothing out an abrupt change in the values of the amount of elastic deformation Pe caused to appear by quantization. The deformation speed computation unit is configured to compute the deformation speed V of the elastic member based upon the driving speed Vd acquired by the driving speed acquisition unit and the approximate rate Ve computed by the approximate rate computation unit, by the following formula:

$$V = A \cdot (-Vd) + B \cdot Ve$$

where A is a coefficient increasing with increase in frequency of fluctuations in a position of the driving force input point, and B is a coefficient increasing with decrease in the frequency of fluctuations in the position of the driving force input point.

With this actuator configured as described above, the deformation speed V that is the rate of change of an amount of elastic deformation of the elastic member can be determined by the deformation speed determination apparatus; therefore, the amount of elastic deformation of the elastic member (i.e., the load applied to the elastic member) can be regulated to desired values appropriately by making use of the deformation speed as determined.

The above-described actuator may preferably but not necessarily further comprise a speed reducer disposed between the driving element and the elastic member to reduce an amount of motion of the driven element relative to an amount of the motion of the driving element.

With this speed reducer disposed between the driving element and the elastic member, the motion whose speed is reduced is to be transmitted to the driving element, and the driving speed Vd acquired as the speed of the driving force input point is, preferably but not necessarily, computed with high precision (resolution) by a reduction ratio (i.e., the ratio of the amount of motion of the driving element to the amount of the motion of the driven element). Therefore, the driving speed Vd can be acquired with increased precision and the deformation speed V of the elastic member can be determined with increased accuracy. Thus-increased precision and resolution in acquired values of the driving speed Vd would permit a wider range of selection of the driving element speed sensors to be used in this actuator; accordingly, the cost can be reduced by using a relatively low-precision driving element speed sensor. This speed reducer may include strain wave gearing which can exhibit a great reduction ratio, so that the aforementioned advantages can be achieved effectively.

In the above-describe actuator, preferably but not necessarily, A+B=1.

In the above-described actuator, the coefficients A and B may be such that A=Ts/(Ts+1), and B=1/(Ts+1) where T is a time constant, and s is an independent variable.

In an embodiment where a speed reducer is disposed between the driving element and the elastic member, the driving speed acquisition unit may include a driving force input point speed computation unit configured to determine the speed of the driving force input point based upon an output of the driving element speed sensor and a reduction ratio of the speed reducer.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which.

DETAILED DESCRIPTION OF THE EMBODIMENTS

A detailed description will be given of an illustrative embodiment of the present invention with reference to the drawings.

Figure 1A:
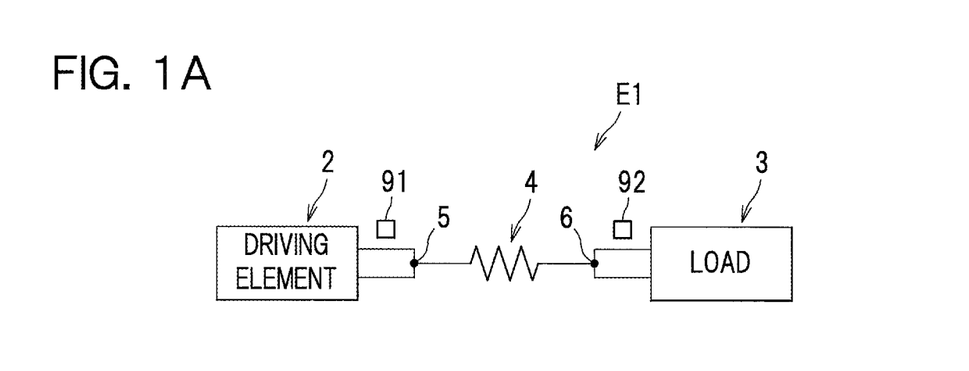
FIG. 1A is a schematic representation of mechanical configuration of an actuator having no speed reducer, to which the present invention is applicable.

According to an illustrative embodiment, an actuator E1 includes a driving element 2, a load 3 as an example of a driven element to be actuated by a driving force transmitted from the driving element 2, and an elastic member 4 that connects the driving element 2 and the driven element. The elastic member 4 has a first end (at which a driving force input point 5 is located according to the present embodiment) configured to receive the driving force from the driving element 2 and a second end (at which a driving force output point 6 is located according to the present embodiment) connected to the load 3 so that a motion (displacement) of the driving element 2 is transmitted through the elastic member 4 to drive (actuate) the load 3. The driving element 2 may be a source of mechanical power (e.g., electric motor) which produces mechanical energy or motion by itself, or any member which is caused to make a motion by an electric motor or other external driving force to act on the first end of the elastic member 4, thereby imparting motion to the elastic member 4. Accordingly, when an external force causes the load 3 to make a motion which in turn imparts a motion to the elastic member 4 thereby causing the driving element 2 to make a motion, the load 3 is considered to be a driving element consistent with one or more embodiments of the present invention and the driving element 2 is considered to be a driven element consistent with one or more embodiments of the present invention.

A sensor 91 as an example of a driving element speed sensor configured to detect a speed of the driving element 2 is disposed in any position between the driving element 2 and the first end (at which the driving force input point 5 is located) of the elastic member 4. The sensor 91 typically includes a sensing element configured to directly measure a displacement (change in position) of a portion to be moved by the action of the driving element 2.

A sensor 92 as an example of a displacement sensor configured to detect an amount of elastic deformation of the elastic member 4 as a quantized value is disposed near the second end (at which the driving force output point 6 is located) of the elastic member 4. The sensor 92 may be, for example, an optical encoder which includes an object to be detected (e.g., an encoder plate) disposed at the driving force input point 5 and a sensing element disposed at the driving force output point 6 and configured to detect the displacement of the object (e.g., a photosensor) whereby the amount of deformation of the elastic member 4 can be detected to output quantized values of the amount of elastic deformation of the elastic member. In order to detect the amount of elastic deformation of the elastic member 4, the sensor 9 may be disposed in a position that is not near the second end (at which the driving force output point 6 is located) of the elastic member 4, or the sensing element and the object to be detected may be disposed vice versa, that is, the sensor 92 may be disposed near the first end (at which the driving force input point 5 is located) of the elastic member 4. Alternatively, the sensor 92 may be a displacement sensor disposed and configured to detect a position near the second end (at which the driving force output point 6 is located) of the elastic member 4. In this alternative embodiment, the sensor 91 may be disposed and configured to detect a position near the first end (at which the driving force input point 5 is located) of the elastic member 4, so that the amount of deformation of the elastic member 4 can be acquired by determining a difference between the outputs of the sensors 92 and 91.

The outputs of the sensors 91 and 92 are provided to a deformation speed determination apparatus which will be described later, and used to determine a rate of change of the amount of elastic deformation (deformation speed V) of the elastic member 4.

The motion of the driving element 2 may be a linear motion or a rotary motion. In an embodiment where the driving element 2 is configured to make a rectilinear motion, the elastic member 4 may, for example, be a compression or extension spring. In an embodiment where the driving element 2 is configured to make a rotary motion, the elastic member 4 may, for example, be a torsion spring deformable by twisting about its axis.

Figure 1B:
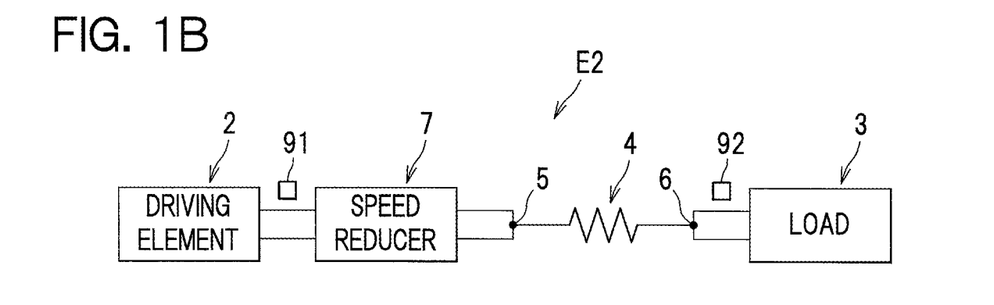
FIG. 1B is a schematic representation of mechanical configuration of an actuator having a speed reducer, to which the present invention is applicable.

The actuator consistent with one or more embodiments of the present invention may be configured to include a speed reducer 7 disposed between the driving element 2 and the elastic member 4 to reduce an amount of motion of the load 3 relative to an amount of motion of the driving element 2 (see an actuator E2 shown in FIG. 1B). In this embodiment with a speed reducer, the sensor 91 may be disposed between the speed reducer 7 and the elastic member 4, but the sensor 91 being disposed between the driving element 2 and the speed reducer 7 as illustrated in FIG. 1B is preferable in many instances. This is because computation of the driving speed Vd at the driving force input point 5 based upon the output of the sensor 91 (the speed of the driving element 2) would make the minimum detectable speed of the driving speed smaller by the reduction ratio of the speed reducer 7, and thus render the resolution of the driving speed Vd higher accordingly.

Figure 2:
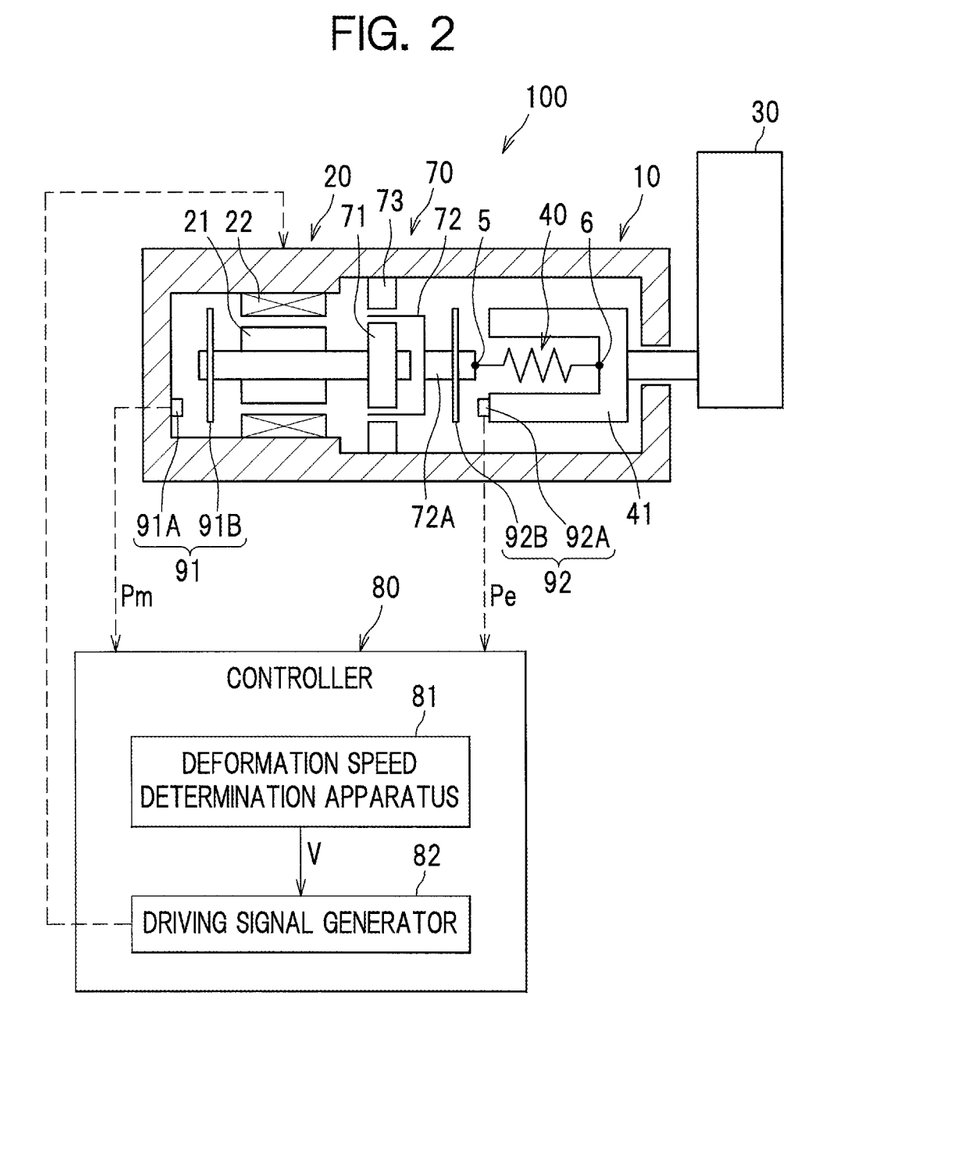
FIG. 2 is a diagram of an actuator according to an exemplary embodiment.

Referring to FIG. 2 et seqq., a more specific description will be given of an illustrative embodiment of the actuator with a speed reducer as in FIG. 1B. An actuator 100 shown in FIG. 2 principally includes a motor 20 as an example of a driving element, a link 30 as an example of a driven element, a strain wave gearing system 70 as an example of a speed reducer for reducing a driving speed of the motor 20, a torsion bar 40 as an example of an elastic member of which two ends are connected to the strain wave gearing system 70 and the link 30, respectively, to transmit the output of the strain wave gearing system 70 to the link 30, and a controller 80 configured to control an operation (motion) of the motor 20.

The motor 20, strain wave gearing system 70 and torsion bar 40 are housed in a housing 10, and each of these members is supported therein rotatably on its own axis. The link 30 is also supported rotatably on its axis at the housing 10. The manner in which each member is supported is not relevant for understanding the present invention, and thus detailed structures of these members are omitted or simplified in illustration of FIG. 2.

The motor 20 includes a rotor 21 and a stator 22, and is configured to be driven (cause the rotor 21 to rotate) in response to a driving signal received from the controller 80 by the stator 22. A sensor 91 is disposed near the motor 20 and configured to detect an angle of rotation (angular displacement) of the motor 20. The sensor includes an encoder plate 91B configured to rotate together with the rotor 21, and a photosensor 91A configured to read a code provided in the encoder plate 91B. A motor displacement Pm that is a signal indicative of the displacement of the motor 20 as detected by the sensor 91 is provided to the controller 80.

The strain wave gearing system 70 includes a wave generator 71, a flex spline 72 and a circular spline 73. The wave generator 71 is connected to the output end of the rotor 21. The flex spline 72 is provided outside the wave generator 71. The circular spline 73 has internal gear teeth which mesh with gear teeth (not shown) provided on an outer peripheral surface of the flex spline 72. The circular spline 73 is fixed to the housing 10, and rotation of the flex spline 72 is outputted.

The flex spline 72 has an output shaft 72A connected to a first end (at which the driving force input point 5 is located) of the torsion bar 40. A second end (at which the driving force output point 6 is located) of the torsion bar 40 is connected to the link 30.

A connecting member 41 that connects the second end of the torsion bar 40 and the link 30 is provided with a photosensor 92A of the sensor 92. The photosensor 92A is configured to detect an amount of elastic deformation Pe of the torsion bar 40. To be more specific, the sensor 92 is configured such that the photosensor 92A reads a code on an encoder plate 92B provided on the output shaft 72A of the flex spline 72 to output quantized values of the amount of elastic deformation Pe. The output of the sensor 92 is provided to the controller 80.

The controller 80 is a device configured to control the operation of the motor 20 to regulate the motion of the link 30. The controller 80 comprises various components among which principal components relevant for implementing the present embodiment include a deformation speed determination apparatus 81 and a driving signal generator 82.

Figure 3:
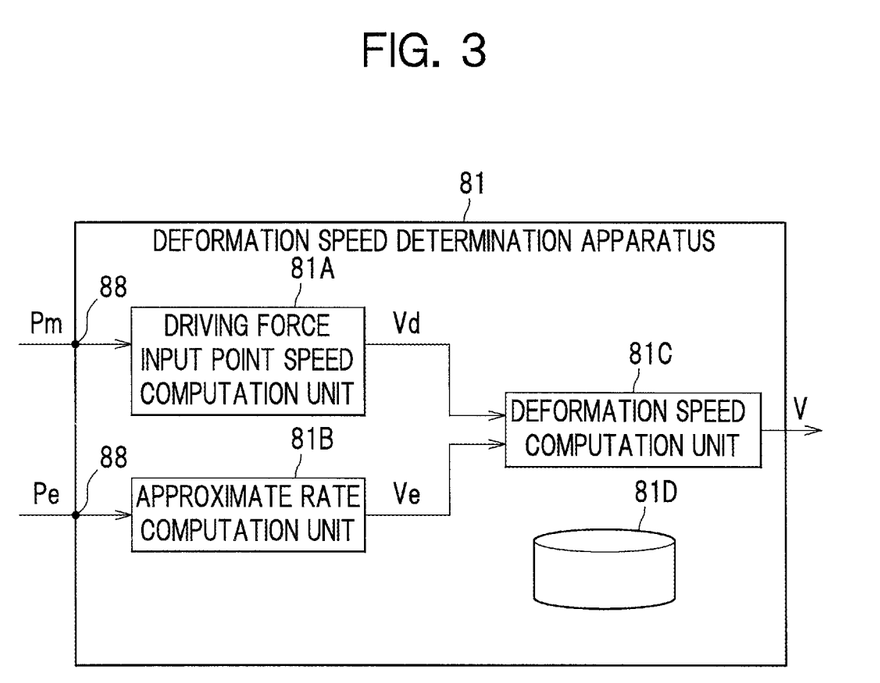
FIG. 3 is a block diagram of a deformation speed determination apparatus according to an exemplary embodiment.

As shown in FIG. 3, the deformation speed determination apparatus 81 includes an driving force input point speed computation unit 81A, an approximate rate computation unit 81B, a deformation speed computation unit 81C, and a storage unit 81D. The deformation speed determination apparatus 81 is configured to determine a deformation speed V of the elastic member (torsion bar 40) based upon the motor displacement Pm and the amount of elastic deformation Pe, and to output thus-determined deformation speed V of the elastic member. The deformation speed determination apparatus 81 in this embodiment is a computer system comprising a central processing unit or CPU, a read-only memory or ROM, a random access memory or RAM, and other components, which cooperate to execute predetermined processes in accordance with programs stored in advance whereby various operations and computations are performed.

More specifically, the driving force input point speed computation unit 81A is configured to compute and determine the driving speed Vd (i.e., the speed of the driving force input point 5 at the first end of the torsion bar 40) based upon the motor displacement Pm inputted through an input interface 88 provided in the controller 80. The driving speed Vd is determined as follows. When any change in the value of the motor displacement Pm is observed, this value of the motor displacement Pm is used to determine a displacement Pd at the driving force input point 5 based upon the reduction ratio of the strain wave gearing system 70. Then, the driving speed Vd(n) at this point in time is calculated with a displacement Pd(n−1) at a previous point in time, the displacement Pd(n) at this point in time and a sampling period DT that is a period of each cycle of detection of the sensor 91 or computation of the deformation speed V, by the following equation:

$$Vd(n) = \frac{Pd(n) - Pd(n-1)}{DT}$$

The motor displacement Pm is detected as an angle, and the driving speed Vd is determined as an angular speed. The driving speed Vd is provided to the deformation speed computation unit 81C. In the present embodiment, the input interface 88 (through which the motor displacement Pm is inputted) and the driving force input point speed computation unit 81A correspond to a driving speed acquisition unit as defined in the appended claims. Similarly, the input interface 88 (through which the amount of elastic deformation Pe is inputted, as will be described below) in the present embodiment corresponds to a deformation amount acquisition unit as defined in the appended claims.

The approximate rate computation unit 81B is configured to compute an approximate rate Ve based upon a plurality of values of the amount of elastic deformation Pe inputted at different points in time through the input interface 88 of the controller 80, the approximate rate Ve being a rate of change of the amount of elastic deformation Pe obtained by smoothing out an abrupt change in the values of the amount of elastic deformation Pe caused to appear by quantization. The method of determining an approximate rate Ve may be selected from various known methods which include a low-pass filtering, a method of moving averages, and a curve fitting. In the present embodiment as will be described below, a curve fitting using a least square approximation is adopted by way of example.

Figure 5A:
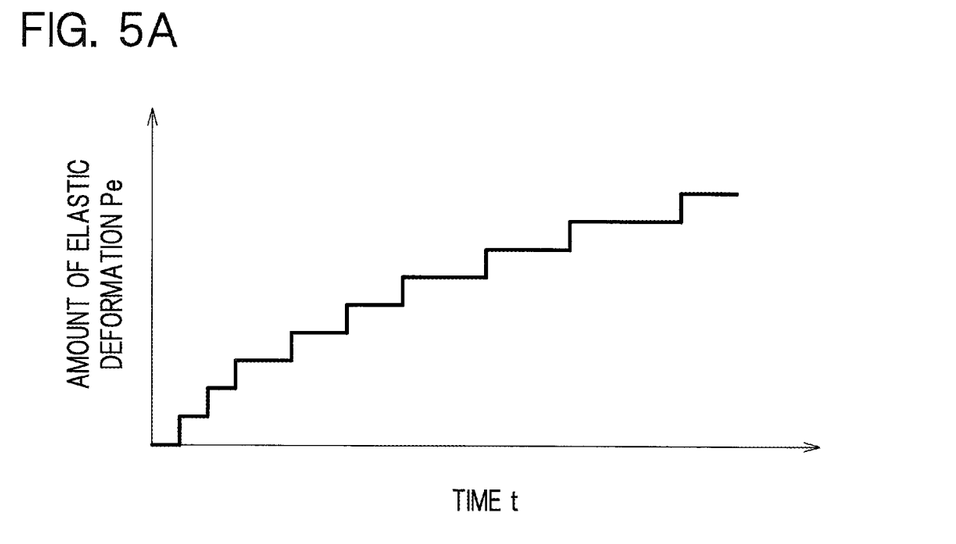
FIG. 5A is a graph showing an example of a time-varying amount of elastic deformation.
Figure 5B:
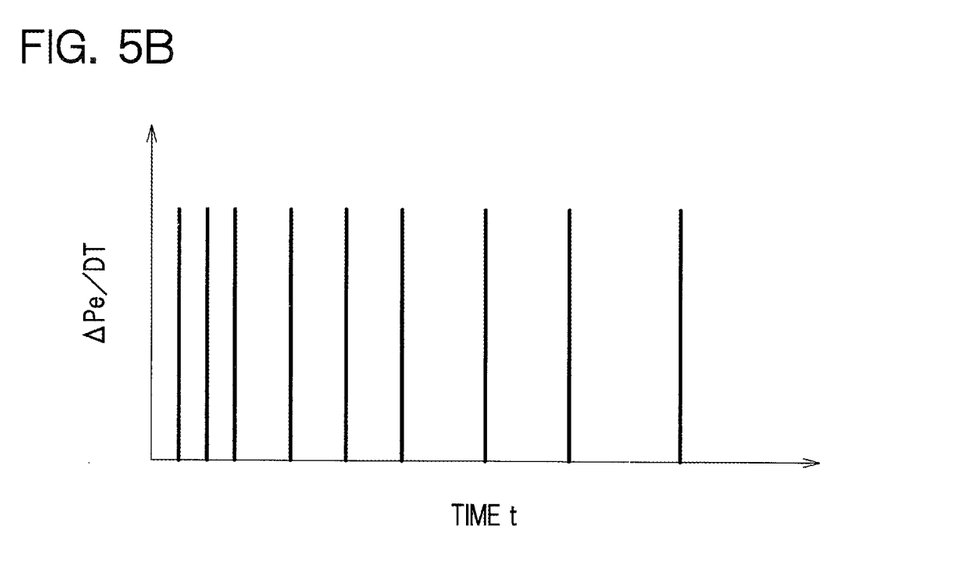
FIG. 5B is a graph showing an example of pre-approximation values of the rate of change ΔPe/DT.

Before making a description of the computation of the approximate rate Ve, the pre-approximation rate of change ΔPe/DT will be described in order to facilitate understanding. The amount of elastic deformation Pe as acquired is a quantized value which the sensor 92 outputs, such that the value changes only at times when the photosensor 92A reads the code on the encoder plate 92B and does not during periods other than those times. Accordingly, the amount of elastic deformation Pe has a characteristic such that for example when the amount of deformation increases by a load being added gradually, the value of the amount of elastic deformation Pe changes stepwise as shown in FIG. 5A. The rate of change ΔPe/DT is then obtained by dividing the difference ΔPe between a value just acquired and a value preceding thereto of the amount of elastic deformation Pe by the sampling period DT. The thus-obtained rate of change ΔPe/DT exhibits abrupt changes such that only when the amount of elastic deformation Pe changes, the value reflecting the change is obtained as a very large value, while otherwise, the value becomes zero, as shown in FIG. 5B.

Next, a least-squares method is adopted; that is, a series of data having values y at a time t, $(t, y) = (t_1, y_1), \ldots, (t_{n\_data}, y_{n\_data})$, is approximated using the following polynomial:

$$\tilde{y} = a_n t^n + a_{n-1} t^{n-1} + \ldots + a_1 t + a_0 \tag{1}$$

In this embodiment, a series of data of the amount of elastic deformation Pe is curve-fitted by the least-squares method, and thus-obtained curve fitting approximate expression of y is differentiated with respect to time t to obtain an approximate rate Ve of change of the amount of elastic deformation Pe.

To obtain the fitting approximation curve represented by the polynomial (1) using the least-squares method, solutions to partial differential equations such that partial differentials of the following evaluation function J as represented by the following equation (2) is equal to zero may be obtained for each $a_n$.

$$J = \Sigma (y_k - \tilde{y})^2 \tag{2}$$

Accordingly, the following simultaneous equations (3) are obtained.

$$\begin{cases} \frac{\partial J}{\partial a_n} = \sum 2 \cdot (y_k - a_n t_k^n - \ldots - a_1 t_k - a_0) \cdot t_k^n = 0 \\ \vdots \\ \frac{\partial J}{\partial a_0} = \sum 2 \cdot (y_k - a_n t_k^n - \ldots - a_1 t_k - a_0) \cdot 1 = 0 \end{cases} \tag{3}$$

The simultaneous equations as represented by the equations (3) may be transformed by transposing the terms of y to the right side, into a matrix which is represented by the following equation (4):

$$\begin{pmatrix} \sum t_k^{2n} & \cdots & \sum t_k^n \\ \vdots & & \vdots \\ \sum t_k^n & \cdots & 1 \end{pmatrix} \begin{bmatrix} a_n \\ \vdots \\ a_0 \end{bmatrix} = \begin{pmatrix} \sum (t_k^n \cdot y_k) \\ \vdots \\ \sum y_k \end{pmatrix} \tag{4}$$

This equation (4) may be further transformed as in the following equation (5):

$$\begin{bmatrix} a_n \\ \vdots \\ a_0 \end{bmatrix} = P^{-1} \cdot Q \tag{5}$$

where P is a matrix on the left side of the equation (4), and Q is a column vector on the right side of the equation (4). With this equation (5), consequently, each of the coefficients $a_0, \ldots, a_n$ of the fitting approximation curve represented by the equation (1) can be obtained.

Herein, each of the elements of the matrix P can be derived, for example, from the following formula (6):

$$\Sigma t_k^n = (-DT)^n + (-2 \cdot DT)^n + \ldots + (-n\_data \cdot DT)^n \tag{6}$$

That is to say, the matrix P is a constant matrix.

Accordingly, the fitting approximation curve of the amount of elastic deformation Pe is represented as follows:

$$\tilde{P}e = a_n t^n + a_{n-1} t^{n-1} + \ldots + a_1 t + a_0 \tag{7}$$

Differentiation of this with respect to time t results in an approximate rate Ve as follows:

$$\tilde{V}e = n \cdot a_n t^{n-1} + (n-1) \cdot a_{n-1} t^{n-2} + \ldots + a_1 \tag{8}$$

In operation, the approximate rate computation unit 81B in this embodiment computes the column vector Q, each time when it receives the amount of elastic deformation Pe, based upon accumulated pieces of data of the amount of elastic deformation Pe which have been obtained up to this time inclusive, and determines the coefficients $a_0, \ldots, a_n$, respectively, of the fitting approximation curve by matrix operation $P^{-1} \cdot Q$, so that the approximate rate Ve is computed. Thus-computed approximate rate Ve is outputted to the deformation speed computation unit 81C.

The deformation speed computation unit 81C is configured to compute the deformation speed V of the torsion bar 40 based upon the driving speed Vd computed by the driving force input point speed computation unit 81A and the approximate rate Ve computed by the approximate rate computation unit 81B, by the following formula:

$$V = A \cdot (-Vd) + B \cdot Ve \quad (9)$$

where A is a coefficient increasing with increase in frequency of fluctuations in a position of the driving force input point 5, and B is a coefficient increasing with decrease in the frequency of fluctuations in the position of the driving force input point 5. In other words, the higher the frequency of fluctuations in the position of the driving force input point 5, the more the driving speed Vd is weighted, while the lower the frequency of fluctuations in the position of the driving force input point 5, the less the driving speed Vd is weighted; the sum of the resulting speed values is the deformation speed V as computed by the deformation speed computation unit 81C. In this respect, it may be preferable that A+B=1. It may be understood that the coefficients A and B functioning as weights assigned according to the frequency as described above can be considered to serve as a high-pass filter and a low-pass filter, respectively.

The coefficients A, B can be determined by the formulae: $A = Ts/(Ts+1)$, and $B = 1/(Ts+1)$ where T is a time constant, and s is an independent variable. To be more specific, $B = 1/(Ts+1)$ may be derived by the following formula (10):

$$\text{Value}_{ThisTime} = \frac{DT}{DT+T} \cdot \text{Value}_{Input} + \frac{T}{DT+T} \cdot \text{Value}_{LastTime} \quad (10)$$

where $\text{Value}_{Input}$ and $\text{Value}_{LastTime}$ are the input and previous values, respectively, of (−Vd) or Ve in the formula (9). On the other hand, $A = Ts/(Ts+1)$ may be derived by $A = 1 - B$.

The deformation speed computation unit 81C in this embodiment, first, computes the coefficients A and B by the aforementioned formula (10), and then computes the deformation speed V by the aforementioned formula (9). Thus-computed deformation speed V is outputted to the driving signal generator 82.

The storage unit 81D is a memory device provided to store values of the acquired motor displacement Pm, the amount of elastic deformation Pe, the coefficients A, B for use in computation, and various other values, where appropriate.

The driving signal generator 82 is a device configured to generate and output a driving signal to a motor 20 under control known in the art exercised based upon the deformation speed V determined in the deformation speed determination apparatus 81 and the amount of deformation Pe detected by the sensor 92. For example, when the link 30 is to be actuated by a driving force transmitted from the motor 20, the driving signal generator 82 outputs to the motor 20 a driving signal such that the maximum value of the amount of elastic deformation Pe is not greater than a specific value. It is however to be understood that the control over the motor 20, as exercised by making use of the deformation speed V determined by the deformation speed determination apparatus 81, may be selected without limitation, and how to actuate the motor 20 may be determined as desired depending upon application.

Next, an exemplary operation of the actuator 100 and the deformation speed determination apparatus 81 (i.e., the method for determining a deformation speed) configured as described above will be described hereinafter with reference to FIG. 2 along with a flow chart shown in FIG. 4.

When a driving signal is transmitted from the driving signal generator 82 to the stator 22 of the motor 20, the rotor 21 rotates, and the encoder plate 91B rotates accordingly. Rotation of the encoder plate 91B is detected by the photosensor 91A, which in turn outputs a motor displacement Pm to the controller 80.

The rotation of the rotor 21 is decelerated by the strain wave gearing system 70 and transmitted to the output shaft 72A, and causes it to rotate. The output shaft 72A imparts a rotational force from the driving force input point 5 to the torsion bar 40, and this rotational force is transmitted to the driving force output point 6, causing the link 30 connected to the driving force output point 6 to rotate. In this operation, the photosensor 92A provided on the connecting member 41 connected with the torsion bar 40 at the driving force output point 6 detects an angular displacement of the encoder plate 92B provided on the output shaft 72A. This angular displacement is a quantized value determined to correspond to the amount of elastic deformation Pe and outputted to the controller 80.

Figure 4:
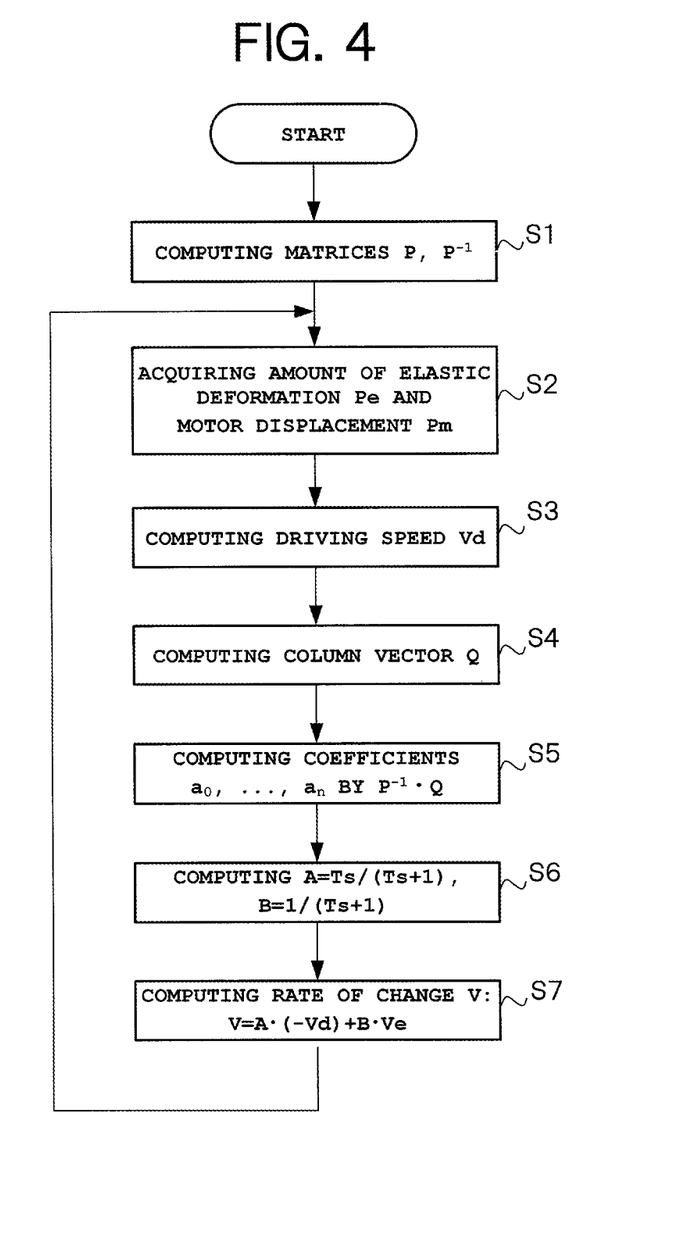
FIG. 4 is a flowchart illustrating an example of an operation process executed by the deformation speed determination apparatus.

As shown in FIG. 4, the controller 80, first, computes the matrix P and its inverse matrix $P^{-1}$ (S1). Since the matrices P, $P^{-1}$ are constant matrices, only one-time computation performed by the approximate rate computation unit 81B suffices to obtain each matrix.

Next, the controller 80 acquires the amount of elastic deformation Pe outputted from the sensor 92 and the motor displacement Pm outputted from the sensor 91 through the input interface 88 (S2).

Then, the driving force input point speed computation unit 81A computes a driving speed Vd that is a speed at the driving force input point 5, based upon the motor displacement Pm acquired at step S2, using the reduction ratio of the strain wave gearing system 70 and the sampling period DT (S3).

The approximate rate computation unit 81B also computes a column vector Q based upon the amount of elastic displacement Pe acquired at step S2 (S4). Subsequently, the approximate rate computation unit 81B computes the coefficients $a_0, \ldots, a_n$ of the fitting approximation curve for use in the least-squares method, by $P^{-1} \cdot Q$ (S5). These steps S4-S5 substantially gives an approximate rate Ve of change of the amount of elastic deformation Pe.

The deformation speed computation unit 81C then computes the coefficients A and B which serve as a high-pass filter and a low-pass filter, respectively, in the subsequent computation, using the formula (10) (S6). Moreover, the deformation speed computation unit 81C computes the deformation speed V using the formula (9) (S7). Following the process steps as described above, the deformation speed V can be determined with good responsiveness and high stability. Although not illustrated in the flowchart of FIG. 4, it is understood that the deformation speed V is outputted to the driving signal generator 82, and the driving signal generator 82 determines the next target rotation amount and rotational force, to output a driving signal to the stator 22.

The controller 80 hereafter continues to execute the operation, going back to step S2 and repeating computation of the deformation speed V (steps S2-S7) for each sampling period DT.

As described above, with the deformation speed determination apparatus 81 according to this embodiment, the deformation speed V of the torsion bar 40 can be determined with improved stability and responsiveness. Furthermore, the actuator 100 can operate appropriately as the motor 20 is controlled with the deformation speed V improved in responsiveness.

Figure 6:
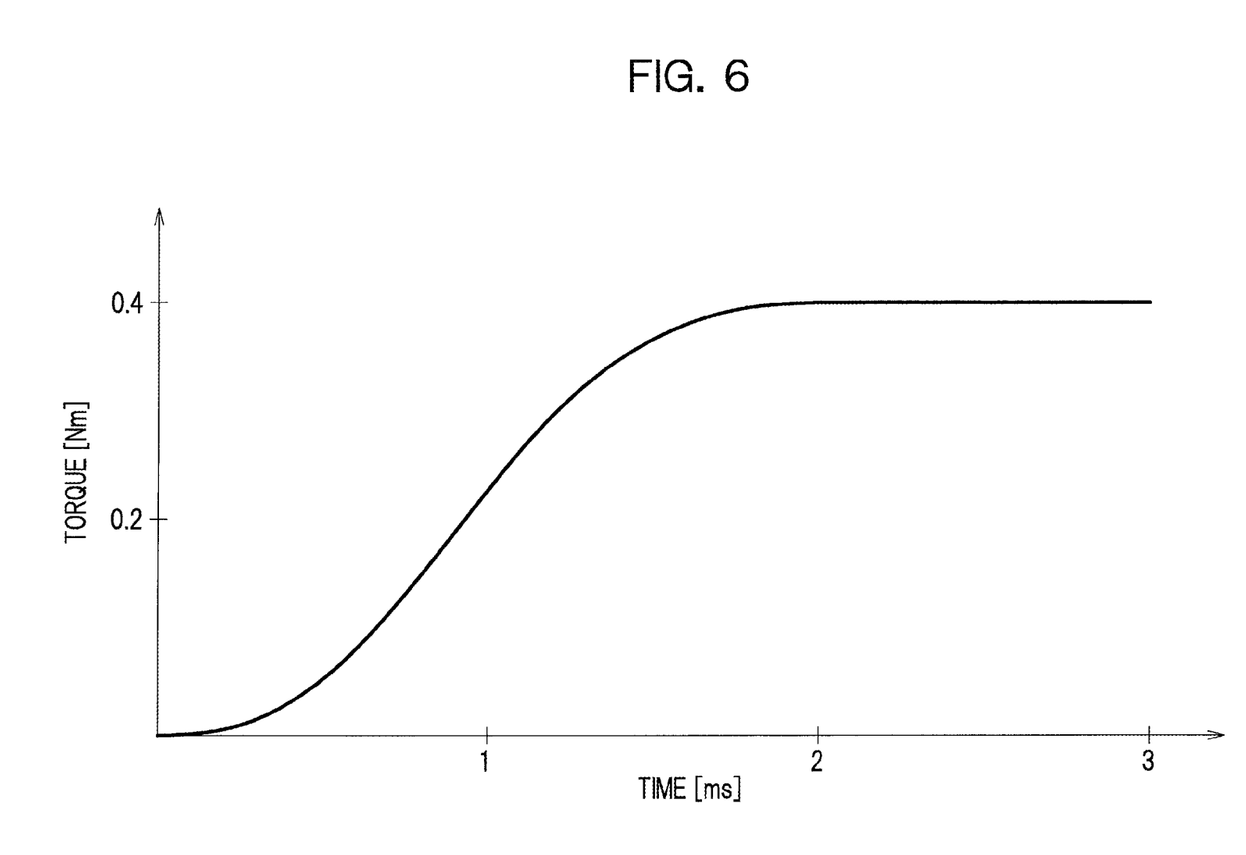
FIG. 6 is a graph of a time-varying input torque computed in a simulation conducted to show an illustrative advantage of the present embodiment.
Figure 7:
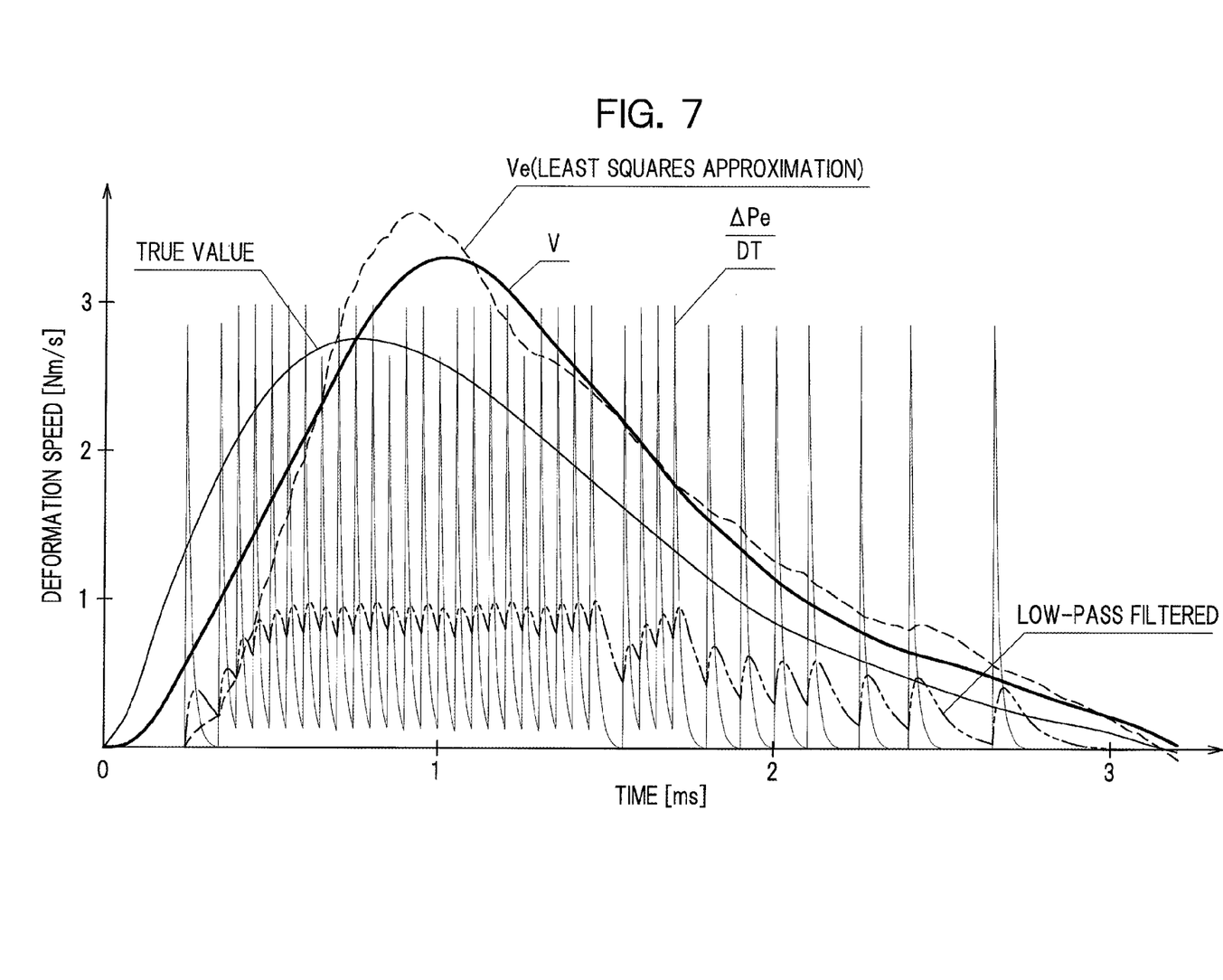
FIG. 7 is a graph of a time-varying deformation speed computed in a simulation conducted to show an illustrative advantage of the present embodiment.

Advantageous effects of the present embodiment have been confirmed by simulation as shown in FIGS. 6 and 7. In the simulation, the motor, speed reducer, torsion bar and a load having a predetermined inertia were three-dimensionally modeled with the conditions set such that the motor generates a torque as shown in FIG. 6.

Deformation speeds of the torsion bar determined by three methods as a result of the simulation are shown on the same coordinates in FIG. 7. In FIG. 7, besides a plot of ΔPe/DT, "LOW-PASS FILTERED" is a plot showing the deformation speed determined by low-pass filtering of ΔPe/DT, "Ve (LEAST SQUARES APPROXIMATION)" is a plot showing the deformation speed Ve determined by least squares approximation, and "V" is a plot showing the deformation speed V determined by the method according to the present embodiment. "TRUE VALUE" is a plot showing an ideal curve of the deformation speed obtained from the input torque. Since DT of ΔPe/DT is very small, each of the peaks of the plot of ΔPe/DT should have values around 250 [Nm/s] in actuality, which cannot be plotted on a scale of 0 to 3 and a little beyond of the axis of ordinates of FIG. 7. Therefore, the plot of ΔPe/DT was filtered to exhibit sufficiently lower peaks for purposes of illustration in FIG. 7. For this reason, the plot of ΔPe/DT exhibited a curve flared after each peak.

As seen in FIG. 7, the low-pass filtered deformation speed differs significantly from the true value; evidently, the method based only on the low-pass filtering would not provide sufficiently precise values. On the other hand, the least squares approximation provided a good profile closely approximating the true value, but showed a delay in start-up, showing poor responsiveness at an early stage of the change in deformation speed. Although the responsiveness would possibly be improved to some extent by reducing the number of data used for computation, such reduction of the number of data would make the resultant values too sensitive to a slight change in the input data, thus impairing the stability.

In contrast, the deformation speed V determined according to the present embodiment provided approximation not only moderately stable but also reflecting the change in the input data at start-up (t=0) with improved responsiveness better than the least squares approximation.

Although some illustrative embodiments have been described above, the present invention is not limited to the illustrated embodiments, and those skilled in the art would appreciate that any modifications or changes may be made thereto appropriately without departing from the scope of the present invention.

For example, the coefficients A, B for use in the deformation speed computation unit are not limited to ones computed as described above. The coefficient A increasing with increase in frequency of fluctuations in a position of the driving force input point may be implemented as a band-pass filter (provided that bands of frequency components to be transmitted and to be attenuated are appropriately predetermined), for example, as represented by the following formula:

$$\frac{s^2 + 2v\omega_0 s + \omega_0^2}{s^2 + 2dv\omega_0 s + \omega_0^2}$$

where v is a bandwidth, d is a gain drop, and $\omega_0$ is a center frequency.

As an alternative to the above-described coefficient B increasing with decrease in the frequency of fluctuations in the position of the driving force input point may be implemented as a second-order filter, for example, as represented by the following formula:

$$\frac{1}{T_1 s + 1} \cdot \frac{1}{T_2 s + 1}$$

As an alternative to the above-described polynomial (1) for use in computation of the approximate rate Ve of change of the amount of elastic deformation Pe, the fitting approximation curve may be implemented as a trigonometric function, for example, as represented by the following formula:

$$a_0 + \sum_{i=1}^{n} (a_i \cos(i\omega) + b_i \sin(i\omega))$$

where $\omega$ is an eigenfrequency.

In the above-described embodiment, the speed reducer provided in the actuator is illustrated with an example disposed between the driving element and the first or driving force input end (at which the driving force input point is located) of the elastic member; however, the speed reducer may be disposed between the second end or driving force output end of the elastic member and the load. It is however to be understood that in order to achieve the aforementioned advantageous effects of increasing the resolution of the driving speed, the speed reducer may preferably be disposed between the driving element and the driving force input point at which a driving force from the driving element is transmitted to the elastic member.

In the above-described embodiment, the displacement sensor configured to detect an amount of elastic deformation Pe of the elastic member to output quantized values of the amount of elastic deformation Pe of the elastic member is illustrated with an example comprising an optical encoder which includes an encoder plate and a photosensor; however, the displacement sensor may comprise a potentiometer or an eddy-current CCD with a quantizer.

What is claimed is:

1. An apparatus for determining a deformation speed V that is a rate of change of an amount of elastic deformation of an elastic member that connects a driving element and a driven element to be actuated, the deformation speed V being determined based upon quantized values of the amount of elastic deformation, the apparatus comprising:
   a driving speed acquisition unit configured to acquire a driving speed Vd that is a speed at a driving force input point at which a driving force from the driving element is transmitted to the elastic member;
   a deformation amount acquisition unit configured to acquire an amount of elastic deformation Pe of the elastic member as a quantized value;
   an approximate rate computation unit configured to compute an approximate rate Ve based upon a plurality of values of the amount of elastic deformation Pe acquired at different points in time by the deformation amount acquisition unit, the approximate rate Ve being a rate of change of the amount of elastic deformation Pe obtained by smoothing out an abrupt change in the values of the amount of elastic deformation Pe caused to appear by quantization; and a deformation speed computation unit configured to compute the deformation speed V of the elastic member based upon the driving speed Vd acquired by the driving speed acquisition unit and the approximate rate Ve computed by the approximate rate computation unit, by the following formula:

$$V = A \cdot (-Vd) + B \cdot Ve$$

where A is a coefficient increasing with increase in frequency of fluctuations in a position of the driving force input point, and B is a coefficient increasing with decrease in the frequency of fluctuations in the position of the driving force input point.

2. The apparatus according to claim 1, wherein A+B=1.

3. The apparatus according to claim 2, wherein A=Ts/(Ts+1), and B=1/(Ts+1) where T is a time constant, and s is an independent variable.

4. A method for determining a deformation speed V that is a rate of change of an amount of elastic deformation of an elastic member that connects a driving element and a driven element to be actuated, the deformation speed V being determined based upon quantized values of the amount of elastic deformation, the method comprising:

acquiring a driving speed Vd that is a speed of a driving force input point at which a driving force from the driving element is transmitted to the elastic member;

acquiring an amount of elastic deformation Pe of the elastic member as a quantized value;

computing an approximate rate Ve based upon a plurality of values of the amount of elastic deformation Pe acquired at different points in time, the approximate rate Ve being a rate of change of the amount of elastic deformation Pe obtained by smoothing out an abrupt change in the values of the amount of elastic deformation Pe caused to appear by quantization; and computing the deformation speed V of the elastic member based upon the driving speed Vd and the approximate rate Ve, by the following formula:

$$V = A \cdot (-Vd) + B \cdot Ve$$

where A is a coefficient increasing with increase in frequency of fluctuations in a position of the driving force input point, and B is a coefficient increasing with decrease in the frequency of fluctuations in the position of the driving force input point.

5. An actuator comprising:
a driving element;
a driven element to be actuated by a driving force transmitted from the driving element;
an elastic member that is an elastically deformable member having a first end configured to receive the driving force from the driving element and a second end connected to the driven element, to transmit a motion of the driving element to the driven element;
a driving element speed sensor configured to detect a speed of the driving element;
a displacement sensor configured to detect an amount of elastic deformation Pe of the elastic member to output quantized values of the amount of elastic deformation Pe of the elastic member; and
a deformation speed determination apparatus configured to determine a deformation speed V that is a rate of change of an amount of elastic deformation of the elastic member, based upon the speed of the driving element detected by the driving element speed sensor and the quantized values of the amount of elastic deformation Pe detected by the displacement sensor,
wherein the deformation speed determination apparatus includes:
a driving speed acquisition unit configured to acquire a driving speed Vd that is a speed of a driving force input point at which the driving force from the driving element is transmitted to the elastic member, based upon the speed of the driving element detected by the driving element speed sensor;
a deformation amount acquisition unit configured to acquire the quantized values of the amount of elastic deformation Pe detected from the displacement sensor;
an approximate rate computation unit configured to compute an approximate rate Ve based upon the quantized values of the amount of elastic deformation Pe acquired at different points in time by the deformation amount acquisition unit, the approximate rate Ve being a rate of change of the amount of elastic deformation Pe obtained by smoothing out an abrupt change in the values of the amount of elastic deformation Pe caused to appear by quantization; and
a deformation speed computation unit configured to compute the deformation speed V of the elastic member based upon the driving speed Vd acquired by the driving speed acquisition unit and the approximate rate Ve computed by the approximate rate computation unit, by the following formula:

$$V = A \cdot (-Vd) + B \cdot Ve$$

where A is a coefficient increasing with increase in frequency of fluctuations in a position of the driving force input point, and B is a coefficient increasing with decrease in the frequency of fluctuations in the position of the driving force input point.

6. The actuator according to claim 5, further comprising a speed reducer disposed between the driving element and the elastic member to reduce an amount of motion of the driven element relative to an amount of the motion of the driving element.

7. The actuator according to claim 5, wherein A+B=1.

8. The actuator according to claim 7, wherein A=Ts/(Ts+1), and B=1/(Ts+1) where T is a time constant, and s is an independent variable.

9. The actuator according to claim 6, wherein the speed reducer includes strain wave gearing.

10. The actuator according to claim 6, wherein the driving speed acquisition unit includes a driving force input point speed computation unit configured to determine the speed of the driving force input point based upon an output of the driving element speed sensor and a reduction ratio of the speed reducer.

11. The actuator according to claim 5, wherein the displacement sensor includes an optical encoder which comprises an encoder plate and a photosensor.

* * * * *